A. BRIGGS.
Flour Mill.
No. 94,808.
Patented Sept. 14, 1869.
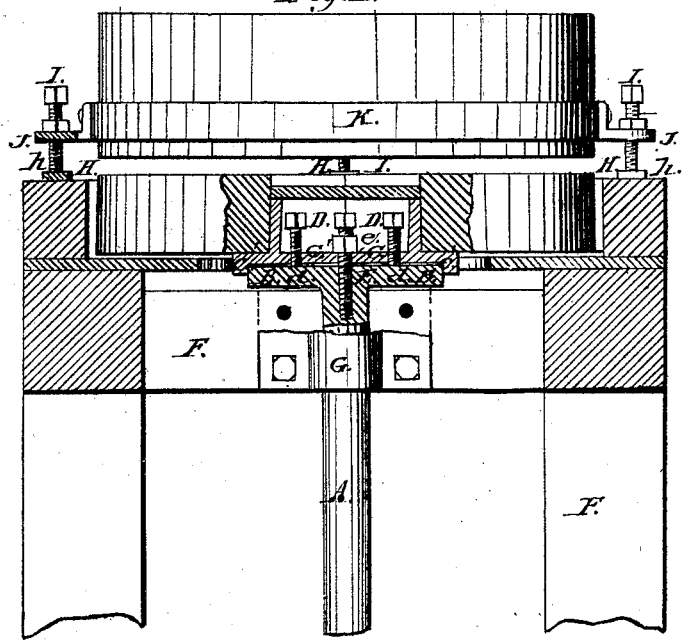
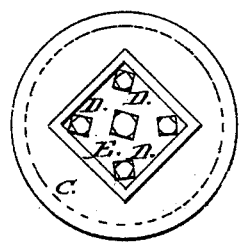
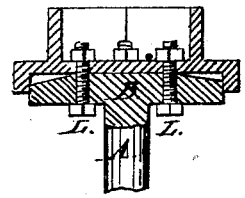
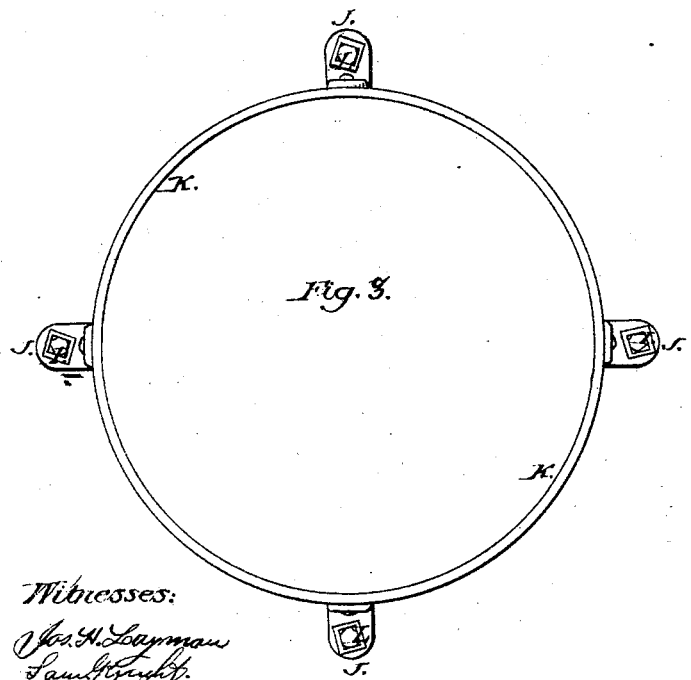
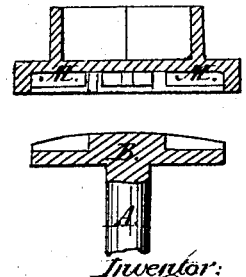

United States Patent Office.

ABRAHAM BRIGGS, OF HARRISON, OHIO.

Letters Patent No. 94,808, dated September 14, 1869.

IMPROVEMENT IN GRINDING-MILLS.

The Schedule referred to in these Letters Patent and making part of the same.

*To whom it may concern:*

Be it known that I, ABRAHAM BRIGGS, of Harrison, Hamilton county, Ohio, have invented certain new and useful Improvements in Grinding-Mills; and I hereby declare the following to be a full, clear, and exact description thereof, reference being had to the accompanying drawings, making part of this specification.

My improvements relate to mills whose lower stone is the runner; and consist, first, of devices by which the runner is attached to and may be trammed on the spindle; and second, to the means for tramming the upper stone, in such a manner that it will yield or give way to any hard matter accidentally introduced beneath it with the grain.

In the drawings—

Figure 1 is an elevation of a mill embodying my improvements, portions thereof being in section.

Figure 2 is a top view of the bush.

Figure 3 is a top view of the band of the upper stone.

Figure 4 is an axial section of the bush and spindle-top, showing a modification of my invention.

Figure 5 is a view of the same, the members being separated to show the driving-clutch.

A is a driving-spindle, stepped in a box, which is made vertically adjustable, by the lighter screw, within a block, which has horizontal adjustment in the frame, by means of wedges. These latter devices are not shown, because forming no part of my present invention.

The spindle-head consists of a horizontal disk, B, whose upper portion is received into a cylindrical recess, $c'$, in the circular bottom C' of the disk C.

D are set-screws, which form a series concentric with the axis of the spindle, and which screw through the plate C'.

The points $d$ of these set-screws rest in recesses in the top of the spindle B, and serve to tram the stone, and also serve as drivers.

In line with the axis of the spindle is a screw, E, which passes downward through a central hole in the bottom C' of the bush, and enters an axial screw-threaded hole in the head of the spindle.

F is the frame of the mill, and

G, the upper box of the spindle.

H are metallic blocks, which are let into the top of the frame, and have cavities $h$, for the reception of the lower ends of the set-screws I, which set-screws turn in screw-threaded lugs J, on a hoop, K, of the upper stone.

Jam-nuts upon the screws I hold them to their adjustment by contact with the lugs J.

The devices are operated as follows:

The spindle being vertical, the lower stone is so placed thereupon that the head B of the spindle enters the recess $c'$ of the bush; the set-screws D are then so turned as to bring the stone into tram; and when this is done, the screw E, with its nut $e$, is tightened to hold the stone firmly to its place upon the spindle-head.

The upper stone is trammed, by means of the set-screws, I with great ease, as this stone may be laid upon the runner, and the screws turned down until their ends have firm bearing in the cavities $h$; the jam-nuts are then tightened, and the stones adjusted in distance by the lighter screw.

The screws I, by which the upper stone is adjusted, resting in open sockets, as described, said stone is adapted to rise on any hard substance getting beneath it, and the destruction of the dress, which would otherwise result, is prevented.

In figs. 4 and 5 is shown a modification of my device for tramming the lower stone. In this, the upper surface of the spindle-head B, or the lower surface of the part C' of the bush, or both, are made somewhat convex, and the bush is attached to the head by bolts L, and is trammed by their means.

M, in the last-named figures, shows lugs on the meeting-surfaces of the spindle-head and bush, which form a driving-clutch, but allow the free adjustment or tramming of the stone.

The bearing sides of the lugs are preferably radial to the head, so as to cause no centrifugal or centripetal pressure in action.

I claim herein as new, and of my invention—

1. A lower-runner millstone, adjustably but rigidly attached to the spindle, substantially as set forth.

2. The means of sustaining the upper millstone by set-screws I, resting in open sockets $h$, as described, for the purpose set forth.

3. Making one or both of the meeting-surfaces of the spindle-head B and bush C convex, and connecting them by set-screws D, as and for the purpose stated.

4. In combination with the convex surfaces of the head B and bush C, or either of them, the driving-lugs M and bolts L, as described.

In testimony of which invention, I hereunto set my hand.

ABRAHAM BRIGGS.

Witnesses:
GEO. H. KNIGHT,
JAMES H. LAYMAN.